US012533299B2

(12) United States Patent
Mellinger

(10) Patent No.: US 12,533,299 B2
(45) Date of Patent: Jan. 27, 2026

(54) SMART TEETHING APPARATUS

(71) Applicant: Johnson & Johnson Consumer Inc., Skillman, NJ (US)

(72) Inventor: Justin Mellinger, Philadelphia, PA (US)

(73) Assignee: Kenvue Brands LLC, Summit, NJ (US)

( * ) Notice: Subject to any disclaimer, the term of this patent is extended or adjusted under 35 U.S.C. 154(b) by 288 days.

(21) Appl. No.: 18/066,516

(22) Filed: Dec. 15, 2022

(65) Prior Publication Data

US 2023/0190584 A1 Jun. 22, 2023

Related U.S. Application Data

(60) Provisional application No. 63/265,855, filed on Dec. 22, 2021.

(51) Int. Cl.
*A61J 17/02* (2006.01)
*A61J 17/00* (2006.01)

(52) U.S. Cl.
CPC ............ *A61J 17/02* (2013.01); *A61J 17/103* (2020.05); *A61J 2200/70* (2013.01)

(58) Field of Classification Search
CPC .. A61J 17/00; A61J 17/02; A61J 17/10; A61J 17/101; A61J 17/103; A61B 5/14539
See application file for complete search history.

(56) References Cited

U.S. PATENT DOCUMENTS

| | | | | |
|---|---|---|---|---|
| 9,114,065 | B2 | 8/2015 | MacDonald et al. | |
| 10,028,892 | B2 | 7/2018 | MacDonald et al. | |
| 10,470,979 | B2 | 11/2019 | Tepper et al. | |
| 2012/0277794 | A1 | 11/2012 | Kountotsis et al. | |
| 2016/0288983 | A1* | 10/2016 | Chin | A61J 7/0015 |
| 2017/0095406 | A1 | 4/2017 | Hakim | |
| 2017/0348187 | A1 | 12/2017 | Piccirillo | |
| 2019/0175104 | A1* | 6/2019 | Malik | A61B 5/145 |

FOREIGN PATENT DOCUMENTS

| | | | |
|---|---|---|---|
| FR | 3106750 | A1 | 8/2021 |
| WO | 2017141233 | A1 | 8/2017 |

OTHER PUBLICATIONS

Written Opinion of the International Searching Authority, for international application PCT/IB2022/062312.

* cited by examiner

*Primary Examiner* — Todd J Scherbel

(57) ABSTRACT

A teething apparatus includes a water-resistant housing containing a controller and a power source and communication means and a plurality of sensors in communication with the surface of the housing arranged and configured to detect at least pH and at least one volatile organic compound. Each of the plurality of sensors is in data communication with the controller and the controller is capable of communication with an external device via communication means. The apparatus may be a component of a larger system and may be used in a method including the steps of providing a teething apparatus to an oral cavity of an infant, establishing a data connection between the teething apparatus and a remote device, and relaying information from the teething apparatus to the remote device, the information comprising the qualitative measurement of one or more volatile organic compounds and the quantitative value of pH in the oral cavity.

7 Claims, 2 Drawing Sheets

SMART TEETHING APPARATUS

CROSS-REFERENCE TO RELATED APPLICATIONS

This application claims the benefit of U.S. Provisional Patent Application Ser. No. 63/265,855, filed Dec. 12, 2021, entitled "SMART TEETHING APPARATUS," the entire disclosure of which is hereby incorporated by reference herein.

BACKGROUND OF THE INVENTION

Field of the Invention

The present invention relates generally to oral comfort devices such as teethers, teething devices and pacifiers for infants. More particularly, this invention relates to smart teething apparatuses having plurality of sensors that can communicate with an external device.

Description of Related Art

Teething is the eruption of baby teeth through the gums. In general, baby teeth begin to erupt by around the age of six months but may start before that time. While teething is often associated with the emergence of teeth, the urge to teethe may be present in infants much earlier, even before they are born. Ultrasound images have revealed that babies suck their hands and wrists in utero as fetuses.

Many teething apparatus (also known as teethers) are sold on the market today to provide children and infants a safe way to obtain relief from teething. Teethers are typically made of rubber, latex, silicone, or other materials that provide resilient surfaces that are hygienic and suitable for soothing the pain of teething. Teethers are often provided in the form of teething rings or other shapes, such as ovals, triangles, squares, etc. In use, teething rings are placed in the baby, or infant's mouth, giving the baby something to chew safely.

Although teething may be one of the sources of discomfort in an infant, discomfort may be the results of a myriad disease states. In general, communication of discomfort in infants is near impossible, outside of parental monitoring of crying, poor sleep behavior, lethargy to name a few.

Physiologic monitors can measure and record temperature, heart rate, respiration, alertness, and activity. Analyte testing of human bodily fluids is also routinely used to aid in the diagnosis of myriad disease states. Blood, urine, saliva, or exhaled breath testing are quite common. One way to non-invasively monitor analytes in the human body is to determine volatile organic compounds (VOCs) found in exhaled breath. There are many known devices for these kinds of analyses.

In summary, teething apparatus are used to give a baby something to chew safely. However, with the lack of communication, and prevalence of conditions such as the onset of Type 1 Diabetes (T1D), a way to non-invasively monitor symptoms physiologically is needed to be able to detect quickly and act fast to prevent any further complications of disease states.

BRIEF SUMMARY OF THE INVENTION

In view of what is needed to help care givers to monitory infant health, I have developed a smart teething apparatus having plurality of sensors that can communicate with a care giver to transfer data regarding one or more infant conditions. Collected data can be analyzed to determine health of infant, diagnose potential disease/illness condition, predict onset of future health issues.

The teething apparatus includes a water-resistant housing containing a controller and a power source and communication means and a plurality of sensors in communication with the surface of the housing arranged and configured to detect at least pH and at least one volatile organic compound. Each of the plurality of sensors is in data communication with the controller and the controller is capable of communication with an external device via communication means.

In addition, I have invented a new and useful a method of monitoring condition of an infant. The method includes the steps of providing a teething apparatus to an oral cavity of an infant, establishing a data connection between the teething apparatus and a remote device, and relaying information from the teething apparatus to the remote device, the information comprising the qualitative measurement of one or more volatile organic compounds and the quantitative value of pH in the oral cavity. The teething apparatus including a water-resistant housing containing a controller and a power source and communication means and a plurality of sensors in communication with the surface of the housing arranged and configured to detect at least pH and at least one volatile organic compound. Each of the plurality of sensors is in data communication with the controller and the controller is capable of communication with an external device via communication means.

DETAILED DESCRIPTION OF THE INVENTION

Figure 1:
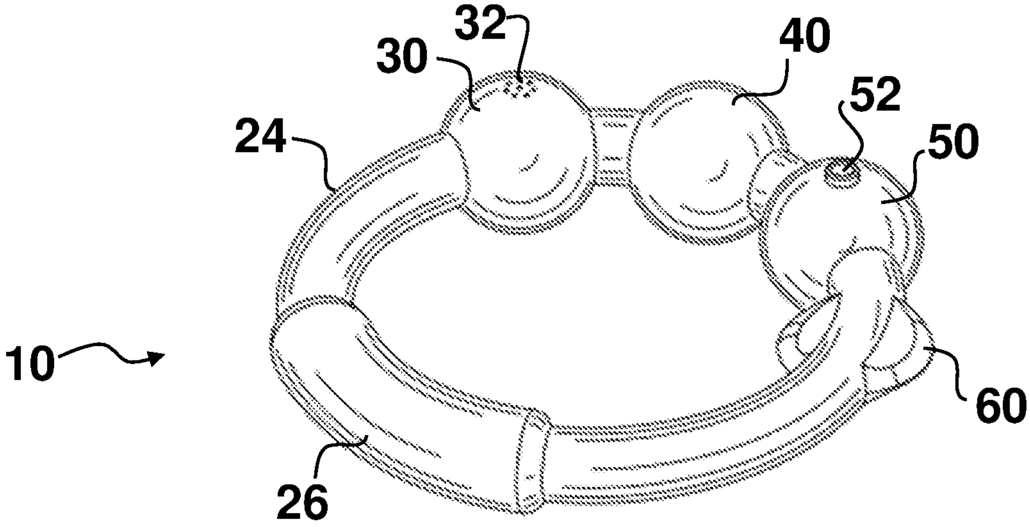
FIG. 1 is a top front perspective view of a teething apparatus of the present invention.

As used herein the specification and the claims, the term "sensor" relates to electronic devices used to measure a physical quantity such as temperature, pressure or loudness or a chemical quantity such as pH, analyte concentration and convert it into an electronic signal.

As used herein the specification and the claims, the term "communication means" relates to electronic components including transmitters, data processors for processing raw data prior to transmitting data or information based on the raw data, and non-volatile memory devices capable of storing data from the sensors, and/or the data processors.

As used herein the specification and the claims, the term "oral fluids" and variants thereof relates to the bodily fluids (liquid or vapor) present in the oral cavity. Oral fluids include saliva, mixtures of saliva and "oral mucosal transudate", and vapors. Saliva is produced by the salivary glands. Oral mucosal transudate enters the mouth by crossing the buccal mucosa from the capillaries. Vapors in the oral cavity include volatile organic compounds (VOCs). VOCs are gaseous molecules that can be sampled quickly and non-invasively from breath. They can originate either from within the body as exhaled breath (endogenous VOCs) or from external sources such as diet, prescription drugs and environmental exposure (exogenous VOCs). VOCs in exhaled breath can represent biomarkers for certain pathologies (lung cancer, asthma, chronic obstructive pulmonary disease and others). Breath gas concentration can then be related to blood concentrations via mathematical modeling as is done, for example, in blood alcohol testing.

The present invention relates to an apparatus and method for delivering comfort to infants. The apparatus is a smart teething apparatus, or teether, having a plurality of sensors that can communicate with an external device. In use, the apparatus is disposed in the infant's oral cavity, and is used in monitoring conditions of an infant.

Teething apparatus has a water-resistant housing. The housing may have an inner body and an external coating. Teething apparatus has a plurality of sensors arranged and configured to detect at least one physiologic or chemical property in the oral cavity of the infant when teething apparatus is placed in the infant's mouth. The sensors are disposed on housing of the teething apparatus and are in communication with the surface of the housing, where "in communication with the surface of the housing" means that the sensors positioned to acquire information relating to the outer surface of the housing, such as by being disposed in contact with the inner surface of the housing, or by being disposed on the outer surface of the housing.

Housing may have a grip section, which can make the teething apparatus easier for the infant to hold during use. Alternatively, the housing, or the external coating of the housing may be textured to aid in gripping the teething apparatus.

The housing can comprise a unibody structure made of a single material. The material used in making the teething apparatus is critical in that it will be placed in the infant's mouth and will be chewed on by the infant. Materials used may include conventional non-toxic materials. Exemplary materials include, without limitation, elastomeric materials, such as silicones, natural rubber or soft plastics, and non-elastomeric materials such as non-splintering hardwoods like natural beechwood.

The teething apparatus may be formed by any useful plastic formation processes including, without limitation, injection molding, thermoforming, liquid silicone injection molding, and the like.

The teething apparatus may alternatively be constructed of an inner body and an outer coating. Here, the material used in making the inner body of teething apparatus may include conventional non-toxic plastic materials. Exemplary plastics include, without limitation, polyethylene terephthalate (PET), high density polyethylene (HDPE), low density polyethylene (LDPE), or polypropylene (PP). The inner body of the teething apparatus may be formed by any useful plastic formation processes including, without limitation, injection molding, thermoforming, liquid silicone injection molding, and the like.

The material used in the outer coating of the teething apparatus may include conventional non-toxic materials. Exemplary materials include, without limitation, silicones and natural rubber. Coating processes include known processes such as, but not limited to, dip coating or spray coating.

The housing of teething apparatus contains a controller, a power source and a communication means. The controller is disposed on a printed circuit board (PCB). The PCB mechanically supports and electrically connects electronic components using conductive tracks, pads and other features etched from copper sheets laminated onto a non-conductive substrate. Components (e.g., capacitors, resistors, controllers, sensors, power sources) are generally soldered on the PCB. Teething apparatus may alternatively use an advanced PCB in which may of the components are embedded in the PCB. The printed circuit board may be flexible, so that it can conform to the fit inside of the housing of the teething apparatus.

The plurality of sensors used in the teething apparatus are also disposed on the printed circuit board. Each of the plurality of sensors is in data communication with the controller. The plurality of sensors include a volatile organic compounds (VOCs) sensor, a temperature sensor, a pH sensor, and a force sensor. Alternatively, the teething apparatus includes only the volatile organic compounds (VOCs) sensor and the pH sensor. It may additionally include other physiological sensors.

The VOCs sensor can have inlet holes disposed on the surface of the housing to allow volatile organic compounds to enter housing and communicate with the VOCs sensor.

The pH sensor can have inlet holes on the surface of the housing to allow oral fluid to enter housing and communicate with the pH sensor.

In the teething apparatus, sensors are used to detect and/or measure at least one or more volatile organic compounds (VOCs), as well as temperature and pH in the oral cavity, along with the force which the infant exert when biting down on the teething apparatus.

VOC sensors, using methods such as photoionization, directly measures ambient concentrations of a broad range of "reducing gases" associated with bad air quality. Examples include, but are not limited to, alcohols, aldehydes, ketones, organic acids, amines, organic chloramines, aliphatic and aromatic hydrocarbons.

Temperature sensors typically made up of two metals which generate electrical voltage or resistance once there is a change in temperature and can be calibrated to accurately measure temperature.

pH sensors, such as those with a pH measurement loop can measure the pH in the oral cavity. A pH measurement loop is essentially a battery where the positive terminal is the measuring electrode and the negative terminal is the reference electrode. The measuring electrode, which is sensitive to the hydrogen ion, develops a potential (voltage) directly related to the hydrogen ion concentration of the solution. The reference electrode provides a stable potential against which the measuring electrode can be compared.

Force sensors, which may materials which, when subjected to force, can change their resistance values. By observing the amount of change in the resistance values of resistors using these materials, the applied force which the infant exerts when biting down on the teething apparatus can be calculated.

Other sensors which may comprise the teething apparatus include those which measure heart rate, heart rate variability, pulse oximetry, blood pressure, breathing rate, and compounds in bodily fluids such as sweat or saliva.

The teething apparatus may have a plurality of sensors arranged and configured in teething apparatus to detect at least one or more volatile organic compound(s) and pH in an infant's oral cavity.

The teething apparatus may also have a plurality of sensors arranged and configured in teething apparatus to detect at least one or more volatile organic compound(s), pH and detect temperature in an infant's oral cavity.

Alternatively, the teething apparatus may also have a plurality of sensors arranged and configured in teething apparatus to detect at least one or more volatile organic compound(s) and pH in an infant's oral cavity, as well to detect pressure, e.g., bite pressure to determine teething/pressure of teething to indicate discomfort or other external pressure applied to the teething apparatus.

The power source used to power the smart teething apparatus is typically a battery or batteries. The battery used in power source may be a disposable battery or a rechargeable battery. If the battery is disposable, the teething apparatus would have to be made so that the housing has an opening to allow user to access and replace the battery. If the power source is a rechargeable battery, the teething apparatus may made with a unibody housing. The battery may be recharged using rechargeable methods such as induction charging. In this case, the rechargeable battery may be operatively connected to an induction coil.

The teething apparatus housing also contains communication means. Communication means allows the controller located inside of the housing to be able to communication with a remote device. The remote device may be a smart device such as a cell phone, or a personal computer or computer network. The communication means may be wired or wireless. If wireless, the communication means may be a transmitter, which may use electromechanical waves such as radio waves, visible or invisible light, or sound. The communication means allows the relaying of information from the smart teething apparatus to the remote device. The information relayed may be qualitative measurement of one or more volatile organic compounds and the quantitative value of pH in the oral cavity. Relayed information may also be in the form of an alert, which can notify the user or caregiver of any conditions which need to be addressed.

The controller may have a data processor capable of processing raw data prior to transmitting data or information based on the raw data, as well as a non-volatile memory device capable of storing data from the sensors and/or the data processor.

The power source and the communication means may be integral with the controller or be in other locations on or off of the PCB inside the housing of the teething apparatus.

The smart teething apparatus generally described above may be manufactured, packaged, and sold as a unitary disposable device. However, a preferred teething apparatus is durable, and can be appropriately cleaned and/or sanitized.

Packaging protects smart teething apparatus from contamination from damage as it keeps the device and/or its components secure as it is shipped from the manufacturer to the consumer.

The teething apparatus generally described above is used in a method of monitoring condition of an infant. The method includes providing the teething apparatus to an oral cavity of an infant, establishing a data connection between the teething apparatus and a remote device, and relaying information from the teething apparatus to the remote device. The information from the teething apparatus may comprise the qualitative measurement of one or more volatile organic compounds and the quantitative value of pH in the oral cavity.

In addition, the information from the teething apparatus may comprise the qualitative measurement of temperature in the oral cavity, or the bite pressure the infant uses when biting down on the teething apparatus. Bite pressure can be used to determine teething/pressure of teething to indicate the infant's discomfort during teething.

Relayed information may also be in the form of an alert, which can notify the user or caregiver of any conditions which need to be addressed.

The teething apparatus may also be part of a system to monitor one or more conditions of an infant. The system comprises the teething apparatus generally described above and a communication module having a software application that is capable of being installed and operable on a computer device to display information related to data obtained by the teething apparatus to a primary caregiver. The module further has one or more relationship models to enable the primary caregiver to provide some or all of the data to secondary care providers.

The presently disclosed subject matter will now be described more fully hereinafter with reference to the accompanying drawings that are provided so this disclosure will be thorough and complete. Unless otherwise defined, all technical and scientific terms used herein have the same meaning as commonly understood by one of ordinary skill in the art to which this presently described subject matter belongs.

Figure 2:
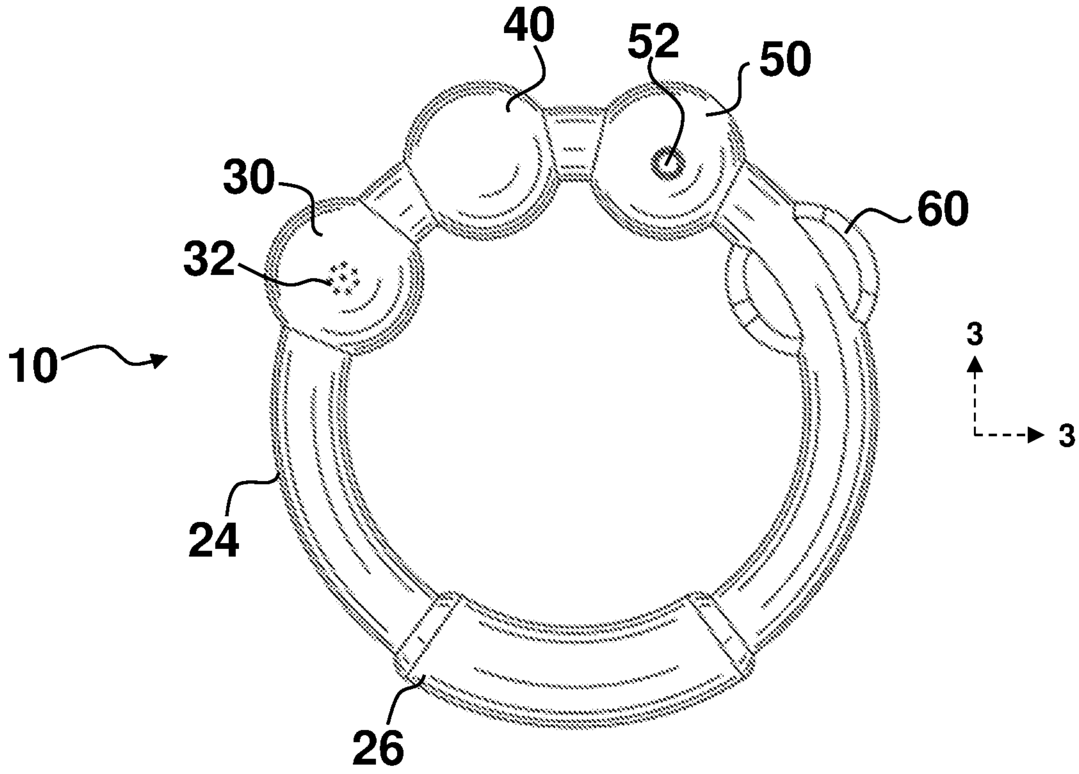
FIG. 2 is a top view of the teething apparatus of FIG. 1.
Figure 3:
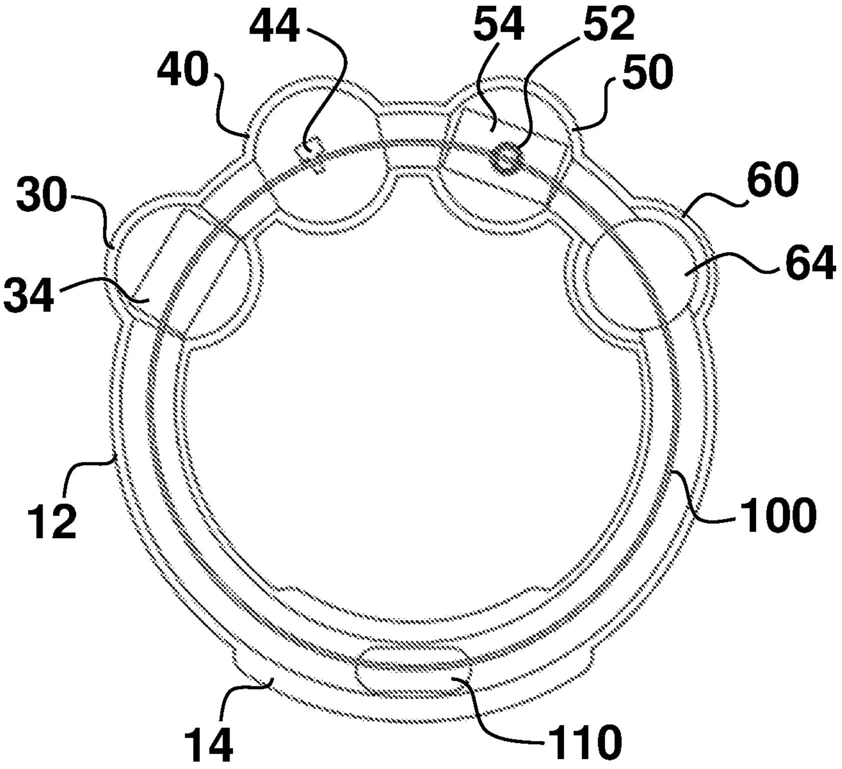
FIG. 3 is a cross-sectional view of the teething apparatus of FIG. 1 in the 3-3 plane of FIG. 2.
Figure 4:
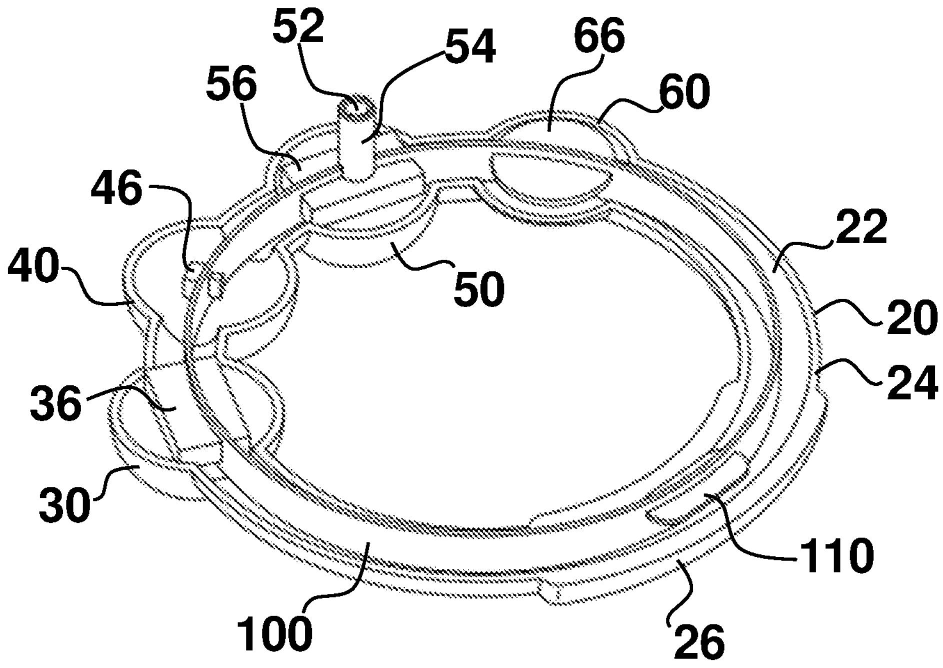
FIG. 4 is a perspective view of the oral fluids collection apparatus of FIG. 1 in the 3-3 plane of FIG. 2.

Referring now to the drawings wherein like reference numerals designate corresponding parts throughout the several views, FIGS. 1 to 4 are views of teething apparatus 10 of the present invention. FIG. 1 is a top front perspective view of teething apparatus 10, while FIG. 2 is a top view of the teething apparatus 10. FIGS. 3 and 4 are cross-sectional views of teething apparatus 10, with FIG. 4 giving a perspective view of the cross-section.

Teething apparatus 10 has a water-resistant housing 20 having an inner body 22 and an external coating 24. The figures show teething apparatus 10 having a plurality of sensors (36, 46, 56, 66). Sensors 36, 46, 56, 66 are arranged and configured to detect at least one physiologic or chemical property in the oral cavity of the infant when teething apparatus 10 is placed in the infant's mouth. Sensors 36, 46, 56, 66 are disposed at locations 30, 40, 50, 60, respectively, on housing 20. Sensors 36, 46, 56, 66 are in communication with the surface of housing 20, where "in communication with the surface of housing 20" comprises sensors 36, 46, 56, 66 being in contact with the inner surface of housing 20, or alternatively, disposed on the outer surface of housing 20.

Housing 20 is shown with a grip section 26. Grip section 26 may make teething apparatus 10 easier for the infant to hold the apparatus during use. Alternatively, housing 20, or external coating 24 of housing 20 may textured to aid in gripping teething apparatus 10.

Sensors 36, 46, 56, 66 include a volatile organic compounds (VOCs) sensor 36, a temperature sensor 46, a pH sensor 56, and a force sensor 66. Alternatively, teething apparatus 10 has a volatile organic compounds (VOCs) sensor 36, and a pH sensor 56. These sensors are arranged and configured to detect at least one or more volatile organic compound(s) and pH.

FIGS. 3 and 4 are cross-sectional views of teething apparatus 10 in the 3-3 plane. The figures show that housing 20 comprises two sections, an inner body 22, and an outer coating 24. Inner body 22 is a hollow, tubular structure. Outer coating 24 covers the entirety of outside of inner body 22.

Alternatively, housing 20 comprises a unibody structure made of a single material.

FIGS. 3 and 4 also show that housing 20 contains a controller 110, as well as a power source 112 and a communication means 114. Controller 110 is disposed on a printed circuit board 100 (PCB). PCB 100 mechanically supports and electrically connects electronic components of teething apparatus 10. PCB 100 may alternatively be an advanced PCB in which may of the components are embedded in the board. Printed circuit board 100 is flexible, so that it can conform to the fit inside of housing 20.

The plurality of sensors 36, 46, 56, 66 are also disposed on printed circuit board 100. Each of the plurality of sensors 36, 46, 56, 66 is in data communication with controller 100. Plurality of sensors 36, 46, 56, 66 include a volatile organic compounds (VOCs) sensor 36, a temperature sensor 46, a pH sensor 56, and a force sensor 66. Alternatively, teething apparatus 10 includes only volatile organic compounds (VOCs) sensor 36 and pH sensor 56 and may additionally include other physiological sensors.

VOCs sensor 36 shown in FIGS. 3 and 4 is located at position 30 on housing 20. Inlet holes 32 on the surface of housing 20 allow volatile organic compounds to enter housing 20 to communicate with VOCs sensor 36.

pH sensor 56 shown in FIGS. 3 and 4 is located at position 50 on housing 20. Inlet holes 52 on the surface of housing 20 allow oral fluid to enter housing 20, flow through tube 54, and communicate with pH sensor 56.

Power source 112 is typically a battery or batteries which may be disposable or rechargeable. If the power source 112 battery is disposable, teething apparatus 10 would have to be made so that housing 20 has an opening to allow user to access and replace the battery. If the power source is a rechargeable battery, teething apparatus 10 may made with unibody housing 20. The battery may be recharged using rechargeable methods such as induction charging. In this case, the rechargeable battery may be operatively connected to an induction coil.

As mentioned above, teething apparatus 10 housing 20 contains communication means 114. Communication means 114 allows controller 110 to be capable of communication with a remote device. Remote device may be a smart device such as a cell phone, or a personal computer or computer network. Communication means 114 may wired or wireless and allows relaying of information from teething apparatus 10 to the remote device.

Controller 110 may have a data processor capable of processing raw data prior to transmitting data or information based on the raw data, as well as a non-volatile memory device capable of storing data from the sensors and/or the data processor.

Power source 112 and communication means 114 may be integral with controller 110 or be in other locations on or off of PCB 100 inside housing 20.

The invention described and claimed herein is not to be limited in scope by the specific embodiments herein disclosed since these embodiments are intended as illustrations of several aspects of this invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All publications cited herein are incorporated by reference in their entirety.

The invention claimed is:

1. A system to monitor one or more conditions of an infant comprising:

(a) a teething apparatus, the teething apparatus consisting essentially of:

(i) a water-resistant housing containing a controller and a power source and communication means;

(ii) a plurality of sensors in communication with the surface of the housing arranged and configured to detect at least pH and at least one volatile organic compound selected from the group consisting of aldehydes, ketones, organic acids, amines, organic chloramines, aliphatic and aromatic hydrocarbons and combinations thereof, wherein each of the plurality of sensors is in data communication with the controller and the controller is capable of communication with an external device via communication means; and (b) a communication module comprising a software application that is capable of being installed and operable on a computer device to display information related to data obtained by the teething apparatus to a primary caregiver, said module further containing one or more relationship models to enable the primary caregiver to provide some or all of the data to secondary care providers.

2. The system of claim 1 wherein the plurality of sensors is further arranged and configured to detect temperature.

3. The system of claim 1 wherein the plurality of sensors is further arranged and configured to detect pressure.

4. The system of claim 1 wherein the communication means is wireless.

5. The system of claim 1 wherein the communication means is wired.

6. The system of claim 1 wherein the power source comprises a rechargeable battery.

7. The system of claim 6 wherein the rechargeable battery is operatively connected to an induction coil.

* * * * *